(12) United States Patent
Yamamoto et al.

(10) Patent No.: US 7,964,653 B2
(45) Date of Patent: Jun. 21, 2011

(54) POLYOL COMPOSITION FOR TWO-COMPONENT CURABLE ABRASIVE FOAM, COMPOSITION FOR TWO-COMPONENT CURABLE ABRASIVE FOAM, ABRASIVE FOAM, AND METHOD FOR PRODUCING ABRASIVE FOAM

(75) Inventors: Fumio Yamamoto, Osaka (JP); Katsuhide Nishimura, Osaka (JP)

(73) Assignee: DIC Corporation, Tokyo (JP)

( * ) Notice: Subject to any disclaimer, the term of this patent is extended or adjusted under 35 U.S.C. 154(b) by 1071 days.

(21) Appl. No.: 10/538,873

(22) PCT Filed: Dec. 16, 2003

(86) PCT No.: PCT/JP03/16099
§ 371 (c)(1), (2), (4) Date: Jan. 30, 2006

(87) PCT Pub. No.: WO2004/055089
PCT Pub. Date: Jul. 1, 2004

(65) Prior Publication Data
US 2006/0122287 A1 Jun. 8, 2006

(30) Foreign Application Priority Data
Dec. 17, 2002 (JP) ................. 2002-365094

(51) Int. Cl.
*C08G 18/28* (2006.01)

(52) U.S. Cl. ........ 521/163; 521/128; 521/130; 521/159; 521/170; 521/174

(58) Field of Classification Search .................. 521/130, 521/159, 163, 170, 174, 128
See application file for complete search history.

(56) References Cited

U.S. PATENT DOCUMENTS

| | | | |
|---|---|---|---|
| 3,635,851 A | 1/1972 | Hoeschele | |
| 6,627,671 B1 * | 9/2003 | Kihara et al. | 521/159 |
| 2002/0183409 A1 | 12/2002 | Seyanagi et al. | |

FOREIGN PATENT DOCUMENTS

| | | |
|---|---|---|
| GB | 1204230 | 9/1970 |
| JP | 49-31980 | 8/1974 |
| JP | 49-35077 | 9/1974 |
| JP | 49-35078 | 9/1974 |
| JP | 55-40709 | 3/1980 |
| JP | 2-232173 | 9/1990 |
| JP | 9-278864 | 10/1997 |
| JP | 11-322877 | 11/1999 |
| JP | 2002-194104 | 7/2002 |
| WO | WO 01/96434 A1 | 12/2001 |

* cited by examiner

*Primary Examiner* — John Cooney
(74) *Attorney, Agent, or Firm* — Edwards Angell Palmer & Dodge LLP

(57) ABSTRACT

A polyol composition contains a polyaminochlorophenylmethane mixture (A) and a polyol (B), in which the component (A) is uniformly dissolved in the component (A) in a weight ratio of 30/70 to 60/40. The component (A) includes 50 to 70% by weight of a specific binuclear polyaminochlorophenylmethane compound, 20 to 40% by weight of a specific trinuclear polyaminochlorophenylmethane compound and 5 to 10% by weight of a specific tetranuclear or higher polyaminochlorophenylmethane compound. The polyol composition exhibits excellent miscibility and dissolution stability, is liquid and enables molding of a foamed article for abrasive in a simple two-component mixing casting machine. According to the present invention, water serving as a foaming agent can be added to the polyol composition containing MBOCA, and the composition for a two-component curable abrasive foam can be held to a temperature equal to or lower than the boiling point of water, thus avoiding water from evaporating upon molding. The resulting abrasive foam has a uniform density distribution and exhibits excellent mechanical properties. A method for satisfactorily producing such an abrasive foam is also provided.

9 Claims, No Drawings

POLYOL COMPOSITION FOR TWO-COMPONENT CURABLE ABRASIVE FOAM, COMPOSITION FOR TWO-COMPONENT CURABLE ABRASIVE FOAM, ABRASIVE FOAM, AND METHOD FOR PRODUCING ABRASIVE FOAM

TECHNICAL FIELD

The present invention relates to a polyol composition for a two-component curable abrasive foam which exhibits satisfactory dissolution stability, a composition for a two-component curable abrasive foam, an abrasive foam, and a method for producing an abrasive foam.

BACKGROUND ART

An amine compound, 4,4'-diamino-3,3'-dichlorodiphenylmethane as a raw material for urethane resins, is generally referred to as MOCA or MBOCA and is used in the production of urethane foam for abrasive and polishing pads (for example, Japanese Patent Application, First Publication No. H2-232173 (Example 1) and Japanese Patent Application, First Publication No. 2002-194104 (claim 1, and Example 1 in paragraph [0034])).

The polishing pad disclosed in Japanese Patent Application, First Publication No. H2-232173, for example, is prepared in the following manner. Water (foaming agent) and an epoxy resin powder are added to a toluene diisocyanate (TDI)-based urethane prepolymer, followed by addition of a catalyst, a silicone oil and 4,4'-diamino-3,3'-dichlorodiphenylmethane (hereinafter also referred to as MBOCA). The mixture is cast in a mold using a casting machine, is foamed and thereby yields a block molded article. The block molded article is sliced to yield the polishing pad.

In this procedure, a two-component mixing casting machine is generally used. This is because MBOCA used herein has a melting point of about 110° C., water has a boiling point of 100° C., and the reaction between the urethane prepolymer and MBOCA (crosslinking reaction) and the reaction with water (foaming reaction) must occur simultaneously. In this molding process, MBOCA must be heated to 110° C. or higher so as to liquefy MBOCA to be suitable for mixing. In contrast, water serving as the foaming agent must not be incorporated into the isocyanate urethane prepolymer in advance, since water reacts with the isocyanate. Thus, water is added to MBOCA in advance. However, water evaporates upon heating of MBOCA at 110° C., i.e., the melting point of MBOCA, or higher so as to liquefy MBOCA. Thus, a desirable foam is not prepared. More specifically, the resulting foamed molded article exhibits increased density variation and lacks uniformity in density distribution which is essential to an abrasive.

Japanese Patent Application, First Publication No. 2002-194104 discloses a molded article prepared by, instead of foaming with water, mixing a prepolymer having a terminal isocyanate group with fine particles treated with a silicone surfactant, adding MBOCA to the mixture and casting the resulting mixture into a mold. Even treated with a surfactant, however, such fine particles are difficult to be uniformly mixed with the prepolymer having a terminal isocyanate group, failing to yield a molded article having a uniform density distribution.

DISCLOSURE OF INVENTION

Accordingly, an object of the present invention is to provide a polyol composition for a two-component curable abrasive foam, which exhibits satisfactory dissolution stability, can stably yield a molded article for use as an abrasive foam in a two-component mixing casting machine and can yield a urethane foam abrasive having excellent mechanical properties as an abrasive foam and exhibiting a uniform density distribution. Another object of the present invention is to provide a composition for a two-component curable abrasive foam, an abrasive foam and a method for producing an abrasive foam using the polyol composition.

Specifically, the present invention provides a polyol composition for a two-component curable abrasive foam, containing (A) a polyaminochlorophenylmethane mixture and (B) a polyol,
the polyaminochlorophenylmethane mixture (A) containing:
50 to 70% by weight of a binuclear polyaminochlorophenylmethane compound represented by the following formula:

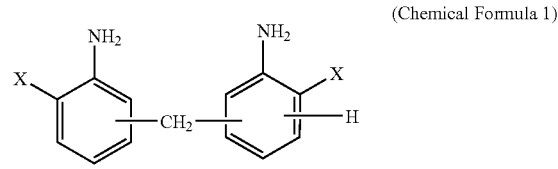

(Chemical Formula 1)

(wherein X independently represents a chlorine atom or a hydrogen atom),
20 to 40% by weight of a trinuclear polyaminochlorophenylmethane compound represented by the following formula (hereinafter referred to as "trinuclear compound"):

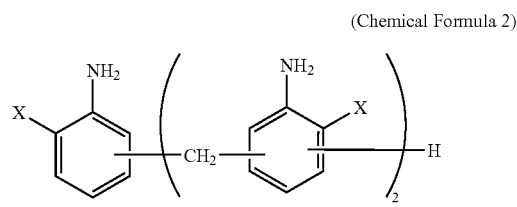

(Chemical Formula 2)

(wherein X independently represents a chlorine atom or a hydrogen atom), and
5 to 10% by weight of a tetranuclear or higher polyaminochlorophenylmethane compound represented by the following formula (hereinafter referred to as "tetranuclear compound"):

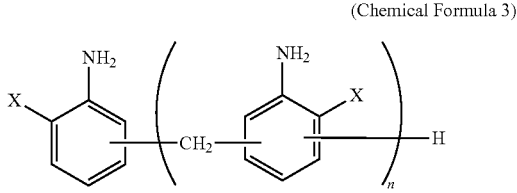

(Chemical Formula 3)

(wherein X independently represents a chlorine atom or a hydrogen atom; and n represents an integer of 3 or greater),
wherein the polyaminochlorophenylmethane mixture (A) is uniformly dissolved in the polyol (B), and the weight ratio of (A) to (B) ((A)/(B)) stands at 30/70 to 60/40. The present invention further provides a composition for a two-component curable abrasive foam, an abrasive foam and a method for producing an abrasive foam using the same.

The binuclear, trinuclear, and tetranuclear or higher polyaminochlorophenylmethane compounds represented by Chemical Formulae 1 to 3 include compounds wherein Xs are all hydrogen atoms. In the present description, these compounds including such compounds wherein Xs are all hydrogen atoms are referred to as "polyaminochlorophenylmethane compound(s)" for the sake of convenience.

BEST MODE FOR CARRYING OUT THE INVENTION

The component (A) for use in the present invention is a polyaminochlorophenylmethane mixture (hereinafter referred to as "mixture (A)"). The mixture (A) comprises 50 to 70% by weight of the binuclear polyaminochlorophenylmethane compound represented by Chemical Formula 1, preferably 4,4'-diamino-3,3'-dichlorodiphenylmethane (hereinafter referred to as MBOCA); 20 to 40% by weight of the trinuclear polyaminochlorophenylmethane compound represented by Chemical Formula 2; and 5 to 10% by weight of the tetranuclear or higher polyaminochlorophenylmethane compound represented by Chemical Formula 3. The mixture (A) is obtained as a product mixture including trinuclear, tetranuclear or higher polyaminochlorophenylmethane compounds in the production of binuclear MBOCA using chloroaniline and formalin as raw materials. The mixture (A) is solid at normal temperature (room temperature), and is melted and becomes liquid at a temperature of preferably 80° C. or lower, and more preferably 50° C. to 80° C.

If the mixture (A) has a composition out of the above-specified range, the polyaminochlorophenylmethane mixture (A) precipitates from the polyol (B) during long-term storage, and the resulting composition exhibits deteriorated dissolution stability. Such a mixture does not yield a product having satisfactory physical properties and a uniform density distribution as a foamed polyurethane abrasive.

The polyol (B) for use in the present invention is a polyol containing an ether bond in a principal chain thereof and having a molecular weight of preferably 100 to 1500, more preferably 500 to 1200, and/or a polyol containing methyl group in a side chain thereof and having a molecular weight of 50 to 500. These polyols each have at least two, preferably two or three, terminal hydroxyl groups, are miscible with the mixture (A) and are liquid at normal temperature (at 25° C.) or, even if solid at normal temperature (at 25° C.), have a melting point of 60° C. or lower. Among them, polyols that become miscible with the mixture (A) upon heating are preferred. Examples of the polyol containing an ether bond in a principal chain thereof are polyethylene glycols, polypropylene glycols, polyethylene propylene glycols, polytetramethylene glycols, diethylene glycol, triethylene glycol, dipropylene glycol and tripropylene glycol. Among them, at least one selected from polytetramethylene glycol and polypropylene glycols is preferred. Each of these may be used in combination.

Examples of the polyol containing methyl group in a side chain thereof are 2-methyl-1,3-propanediol, 3-methyl-1,5-pentanediol, and polyester polyols derived from these glycols and adipic acid. Each of these can be used in combination.

The polyol (B), in which the mixture (A) is dissolved, is selected from among the above-mentioned polyols and, in the production of an abrasive containing a grain (abrasive grain), is selected according to the amount of the grain. This is to avoid an excessively high viscosity of the composition for a two-component curable abrasive foam caused by addition of such grains, which makes the composition unsuitable for molding in a regular two-component mixing casting machine. The viscosity of the polyol (B) is preferably 50 to 1000 poises (at 25° C.).

The weight ratio ((A)/(B)) of the mixture (A) to the polyol (B) in the polyol composition of the present invention stands at 30/70 to 60/40. If the weight percentage of the mixture (A) exceeds 60, the polyol composition for a two-component curable abrasive foam (1) exhibits deteriorated dissolution stability, thus inviting precipitates from the mixture (A), which may lead to clogging of the two-component mixing casting machine. If it is less than 30, the abrasive foam exhibits remarkably deteriorated mechanical properties and is less worthy as an abrasive. The polyol composition of the present invention is preferably liquid at 25° C. and preferably has a viscosity of 300 to 3000 poises (at 25° C.). The polyol composition of the present invention has an $NH_2.OH$ equivalent of preferably 50 to 300 and more preferably 100 to 250. The polyol composition is prepared by melting the mixture (A) by heating preferably at 100° C. to 120° C. and mixing the melted mixture (A) with the polyol (B) preferably heated at 80° C. to 110° C. in the above-specified weight ratio. In this procedure, the polyol composition is preferably subjected to dehydration at 100° C. to 110° C. at a reduced pressure of 5 to 10 mmHg for 30 minutes to 2 hours before the completion of its preparation.

The water (3) for use in the present invention is used as a foaming agent and can be any of water without contamination or turbidity and tap water. Among them, ion-exchanged water and pure water are preferred. The amount of the water (3) is preferably 0.01 to 5% by weight and more preferably 0.05 to 2% by weight based on the weight of the polyol composition comprising the components (A) and (B).

The polyisocyanate (2) for use in the composition for a two-component curable abrasive foam of the present invention is preferably a urethane prepolymer having a terminal isocyanate group, which has been prepared by the reaction of a polyisocyanate compound (2-1) with a polyol (2-2).

Examples of the polyisocyanate compound (2-1) are 2,4- or 2,6-toluene diisocyanate, 1,4-tetramethylene diisocyanate, 1,6-hexamethylene diisocyanate, 1,12-dodecamethylene diisocyanate, cyclohexane-1,3- or 1,4-diisocyanate, 1-isocyanato-3-isocyanatomethyl-3,5,5-trimethylcyclohexane (also known as isophorone diisocyanate; hereinafter referred to as IPDI), bis-(4-isocyanatocyclohexyl)methane (hereinafter referred to as "hydrogenated MDI"), 2- or 4-isocyanatocyclohexyl-2'-isocyanatocyclohexylmethane, 1,3- or 1,4-bis-(isocyanatomethyl)-cyclohexane, bis-(4-isocyanato-3-methylcyclohexyl)methane, 1,3- or 1,4-α,α,α',α'-tetramethylxylylene diisocyanate, 2,2'-, 2,4'- or 4,4'-diisocyanatodiphenylmethane (hereinafter referred to as MDI), 1,5-naphthalene diisocyanate, p- or m-phenylene diisocyanate, xylylene diisocyanate and diphenylmethane-4,4'-diisocyanate. Among them, 2,4- or 2,6-toluene diisocyanate is preferred.

The polyol (2-2) preferably has a molecular weight of 500 to 3000. Examples thereof are polyethylene glycols, polypropylene glycols, polyethylene/propylene glycols, polytetramethylene glycols, 2-methyl-1,3-propane adipate, 3-methyl-1,5pentane adipate and polycarbonate polyols. In addition, a glycol having a molecular weight of 50 to 300 may be used in combination. The polyol is more preferably a polytetramethylene glycol or polypropylene glycols having a molecular weight of 500 to 1200.

Toluene diisocyanate-type urethane prepolymers each containing a terminal isocyanate group are more preferred as the polyisocyanate (2) for use in the composition for a two-component curable abrasive foam of the present invention.

Among them, one having a melting point of 60° C. or lower is further preferred, and one which is liquid at normal temperature is typically preferred. Typically from the viewpoint of mechanical strength, the polyisocyanate (2) is preferably a polyisocyanate having an isocyanate equivalent of 300 to 580 and is prepared by the reaction of 2,4- or 2,6-toluene diisocyanate as the polyisocyanate with the polyol. The above-mentioned other polyisocyanate compounds can be additionally used in combination.

Examples of the glycol having a molecular weight of 50 to 300 are aliphatic diols such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, 3-methyl-1,5-pentanediol, 2-butyl-2-ethyl 1,3-propanediol and 2-methyl-1,3-propanediol; alicyclic diols such as 1,4-cyclohexanediol, 1,4-cyclohexanedimethanol and hydrogenated bisphenol A; and trifunctional or higher components such as glycerol, trimethylolpropane and pentaerythritol.

In the composition for a two-component curable abrasive foam of the present invention, the weight proportions of the polyisocyanate (2) and the polyol composition (1) comprising the mixture (A), the polyol (B) and water (3) are set so that the amount of OH group and $NH_2$ group stands at preferably 0.6 to 1 equivalent, and more preferably 0.7 to 0.95 equivalent per 1 equivalent of isocyanate group, wherein the amount of 1 mole of the water is defined as 2 equivalents in terms of OH group.

The polyol composition for a two-component curable abrasive foam of the present invention may appropriately further comprise, for example, urethanization catalysts, abrasive grain, foam stabilizers, fillers, pigments, thickening agents, antioxidants, ultraviolet absorbers, surfactants, flame retardants and/or plasticizers. Among them, urethanization catalysts and foam stabilizers are preferably added.

Examples of the urethanization catalyst are nitrogen-containing compounds such as triethylamine, triethylenediamine and N-methylmorpholine; metal salts such as potassium acetate, zinc stearate and tin octylate; and organometallic compounds such as dibutyltin dilaurate. Examples of the foam stabilizer are silicone surfactants such as Toray Silicone SH-193, SH-192 and SH-190 (products of Dow Corning Toray Silicone Co., Ltd.). The amount thereof is preferably 0.01 to 5% by weight based on the weight of the polyol composition.

Preferred examples of the abrasive grain include cerium oxide, zirconium oxide, silicon carbide and alumina. A foamed molded article prepared by compounding these materials is useful as a material for producing a foamed urethane abrasive by cutting. Among them, cerium oxide and zirconium oxide are typically preferred.

The average particle size of the abrasive grain is not specifically limited and is preferably 0.1 μm to 200 μm, depending on the purpose of polishing. If the average particle size of the abrasive grain exceeds 200 μm, the composition may tend to precipitate in a tank of the two-component mixing casting machine and may cause clogging of head nozzles. The abrasive grain precipitates more readily with an increasing average particle size thereof. Thus, the structure and number of rotations of an impeller in the tank of the two-component mixing casting machine should be set appropriately.

The amount of the grain preferably falls within a range of 10 to 200 parts by weight per 100 parts by weight of the total amount of the mixture (A) and the polyol (B).

When used in the method for producing an abrasive foam of the present invention using the composition for a two-component curable abrasive foam of the present invention, it is preferred that the polyol composition comprising the mixture (A) and the polyol (B) exhibits good miscibility between (A) and (B) and be liquid at 25° C., or that the polyol composition be a uniform liquid mixture when heated at 40° C. to 70° C. According to the method, a molded article for abrasive foam is prepared in the following manner. The polyol composition (1) added with the water (3), and the polyisocyanate, preferably a urethane prepolymer containing a terminal isocyanate group, (2) are separately placed into each tank of a two-component mixing casting machine. The polyol composition (1) is heated preferably at 40° C. to 70° C. and the polyisocyanate (2) is heated preferably at 40° C. to 90° C. These heated components are mixed in the two-component mixing casting machine to yield a mixture, and the mixture is cast in a mold at a temperature of preferably 80° C. to 120° C. and more preferably 90° C. to 110° C. The proportions of the components are set so that the reaction smoothly proceeds and foaming and curing occur simultaneously. The resulting article is preferably left in the mold at 80° C. to 120° C. for 30 minutes to 2 hours, is then taken out from the mold, and is subjected to after-curing preferably at 100° C. to 120° C. for 8 to 17 hours. The molded article may be cut into sheets having a thickness of preferably 0.5 to 3 mm using a slicer to yield an abrasive foam sheet.

In the production of an abrasive using the composition for a two-component curable abrasive foam, the abrasive grain can be incorporated into either of the polyol composition (1) and the polyisocyanate (2) in advance, but is preferably incorporated into the polyol composition (1) for satisfactory stability of the resulting mixture. For satisfactorily uniform dispersion, the grain is preferably added in several installments into the polyol composition comprising the mixture (A) and the polyol (B) in advance while agitating in a high-speed agitator. The high-speed agitation makes the surface of the abrasive grain more wettable, which avoids aggregation of the abrasive grain by the action of the air. The mixture is more preferably defoamed in vacuo to evacuate the air from the grain and make the grain more wettable. Higher wettability of the abrasive grain enables the urethane resin to bind with the abrasive grain more firmly to thereby prevent the abrasive grain from dropping off during polishing. The abrasive preferably comprises the abrasive grain, but may not comprise the abrasive grain in some applications.

The specific gravity of the two-component curable abrasive foam of the present invention is preferably 0.3 to 1.0 when not containing the abrasive grain, and is preferably 0.3 to 1.2 when containing the abrasive grain. The abrasive foam having an excessively low specific gravity may have insufficient strength and may invite remarkable wear. The abrasive foam having an excessively high specific gravity includes fewer pores and may not effectively polish a work.

The polyol composition of the present invention is preferably liquid at normal temperature. This achieves easier mixing of water, the foam stabilizer and the catalyst. In addition, the amount of the abrasive grain can be set within a wide range by selecting a suitable polyol. The polyol composition of the present invention allows molding in a two-component mixing casting machine, is free from evaporation of water and can easily yield a urethane foam for abrasive foam having a uniform density distribution and excellent mechanical properties. If the density distribution is ununiform, the polishing performance becomes non-uniform and the product cannot be used as an abrasive foam for polishing precision products such as silicon for the production of semiconductors and glass for lenses.

EXAMPLES

The present invention will be further illustrated with reference to several examples below, which are not intended to limit the scope of the present invention. All parts and percentages are by weight.

Example 1

Mixing and Preparation of Mixture (A) and Polyol (B)

A polytetramethylene glycol (PTMG1000, a product of Mitsubishi Chemical Corporation) as a polyol was placed in a flask and held at 100° C. Separately, a mixture (A) was prepared by dissolving 65% of 4,4'-diamino-3,3'-dichlorodiphenylmethane (binuclear compound), 28% of a trinuclear polyaminochlorophenylmethane compound and 7% of a tetranuclear or higher polyaminochlorophenylmethane compound at 70° C. The mixture (A) was fused at 120° C. and was added to the polyol in the flask in amounts of 30%, 40%, 50% and 60% based on 70%, 60%, 50% and 40% of the polyol, respectively. The resulting mixture was blended and was subjected to dehydration at 100° C. to 105° C. at a reduced pressure of 5 to 10 mmHg for 1 hour. The product was taken out from the flask after cooling, to yield a liquid polyol composition.

Comparative Example 1

A polytetramethylene glycol (PTMG1000, a product of Mitsubishi Chemical Corporation) as a polyol was placed in a flask and was held at 100° C. Separately, a mixture of 82% of 4,4'-diamino-3,3'-dichlorodiphenylmethane (binuclear compound), 15% of a trinuclear compound and 3% of a tetranuclear compound was fused at 120° C. and was added to the polyol in the flask in amounts of 30%, 40%, 50% and 60% based on 70%, 60%, 50% and 40% of the polyol, respectively. The resulting mixture was blended and was subjected to dehydration at 100° C. to 105° C. at a reduced pressure of 5 to 10 mmHg for 1 hour. The product was taken out from the flask after cooling, to yield a liquid polyol composition.

Comparative Example 2

A polytetramethylene glycol (PTMG1000, a product of Mitsubishi Chemical Corporation) was placed in a flask and was held at 100° C. Separately, PANDEX E (a product of Dainippon Ink and Chemicals, Inc.) containing 98% by weight or more of 4,4'-diamino-3,3'-dichlorodiphenylmethane (binuclear compound) was fused at 120° C. and was added to the polyol in the flask in amounts of 30%, 40%, 50% and 60% based on 70%, 60%, 50% and 40% of the polyol, respectively. The resulting mixture was blended and was subjected to dehydration at 100° C. to 105° C. at a reduced pressure of 5 to 10 mmHg for 1 hour. The product was taken out from the flask after cooling, to yield a liquid polyol composition.

Example 2

Mixing and Preparation of Mixture (A) and Polyol (B)

A polyol mixture (B) was prepared by adding 34.1 parts of diethylene glycol (a product of Mitsubishi Chemical Corporation) to 500 parts of a polytetramethylene glycol (PTMG1000, a product of Mitsubishi Chemical Corporation) and was held at 100° C. The mixture (A) used in Example 1 was fused at 120° C. and was added to the polyol mixture (B) in the flask in amounts of 30%, 40%, 50% and 60% based on 70%, 60%, 50% and 40% of the polyol mixture, respectively. The resulting mixture was blended and was subjected to dehydration at 100° C. to 105° C. at a reduced pressure of 5 to 10 mmHg for 1 hour. The product was taken out from the flask after cooling, to yield a liquid polyol composition.

Comparative Example 3

A polyol mixture was prepared by adding 34.1 parts of diethylene glycol (a product of Mitsubishi Chemical Corporation) to 500 parts of a polytetramethylene glycol (PTMG1000, a product of Mitsubishi Chemical Corporation) and was held at 100° C. PANDEX E used in Comparative Example 2 was fused at 120° C. and was added to the polyol mixture (B) in the flask in amounts of 30%, 40%, 50% and 60% based on 70%, 60%, 50% and 40% of the polyol mixture, respectively. The resulting mixture was blended and was subjected to dehydration at 100° C. to 105° C. at a reduced pressure of 5 to 10 mmHg for 1 hour. The product was taken out from the flask after cooling, to yield a liquid polyol composition.

The mixtures prepared according to Examples 1 and 2 and Comparative Examples 1, 2, and 3 were left to stand at 25° C. for one day, one week, three months and six months, and the appearances of the resulting mixtures were observed to determined the dissolution stability.

TABLE 1

| | Composition of (A) Polyaminochlorophenylmethane compound | (B) Polyol | Elapsed Time | Content of (A) (% by weight) | | | |
|---|---|---|---|---|---|---|---|
| | | | | 30% | 40% | 50% | 60% |
| Example 1 | binuclear compound 65% | PTMG1000 | 1 day | A | A | A | A |
| | trinuclear compound 28% | | 1 week | A | A | A | A |
| | tetranuclear compound 7% | | 3 months | A | A | A | A |
| | | | 6 months | A | A | A | A-B |
| Comparative Example 1 | binuclear compound 82% | PTMG1000 | 1 day | A | A | B | C |
| | trinuclear compound 15% | | 1 week | A | A | B | C |
| | tetranuclear compound 3% | | 3 months | A | C | C | C |
| | | | 6 months | A-B | C | C | C |
| Comparative Example 2 | MBOCA as binuclear compound 98%< | PTMG1000 | 1 day | A | A | C | C |
| | trinuclear compound 1%> | | 1 week | A | A | C | C |
| | tetranuclear compound 1%> | | 3 months | A | C | C | C |
| | | | 6 months | A-B | C | C | C |

TABLE 1-continued

|  | Composition of (A) Polyaminochlorophenylmethane compound | (B) Polyol | Elapsed Time | Content of (A) (% by weight) | | | |
|---|---|---|---|---|---|---|---|
|  |  |  |  | 30% | 40% | 50% | 60% |
| Example 2 | binuclear compound 65% trinuclear compound 28% tetranuclear compound 7% | PTMG1000 DEG | 1 day 1 week 3 months 6 months | A A A A | A A A A | A A A A | A A A A-B |
| Comparative Example 3 | MBOCA as binuclear compound 98%< trinuclear compound 1%> tetranuclear compound 1%> | PTMG1000 DEG | 1 day 1 week 3 months 6 months | A A A A-B | A A C C | B B C C | C C C C |

(Criteria) A: transparent, pale brown solution B: hazy C: precipitates such as MBOCA Table 1 shows that the polyol compositions of the present invention comprising the mixture (A) (65% of a binuclear compound, 28% of a trinuclear compound and 7% of a tetranuclear compound) dissolved in the polyol (B) are transparent and pale brown solutions and exhibit excellent dissolution stability over a long period of time. In contrast, the compositions according to Comparative Examples 1, 2, and 3 each comprising a higher content of MBOCA (binuclear compound) invite hazy turbidity in early stages and precipitation typically of MBOCA and exhibit deteriorated dissolution stability.

<Preparation 1> Preparation of Urethane Prepolymer (i)

A total of 500 parts of Collonate T-100 (toluene diisocyanate, a product of Nippon Polyurethane Industry Co., Ltd.) was placed in a flask. A total of 556.0 parts of PTMG1000 (polytetramethylene glycol, a product of Mitsubishi Chemical Corporation) and 93.4 parts of DEG (diethylene glycol, a product of Mitsubishi Chemical Corporation) were added thereto in plural installments, followed by reaction at 60° C. under flow of nitrogen gas for about 5 hours, to yield a urethane prepolymer (i) having an isocyanate equivalent of 400.

<Preparation 2> Preparation of Polyol Composition of the Present Invention

In a flask were placed 500 parts of PTMG1000 (polytetramethylene glycol, a product of Mitsubishi Chemical Corporation) and 34.1 parts of DEG (diethylene glycol, a product of Mitsubishi Chemical Corporation), and the mixture was held at 100° C. Separately, 534.1 parts of a mixture (A) containing 65% of a binuclear compound, 28% of a trinuclear compound and 7% of a tetranuclear compound was fused at 120° C. and was placed into the flask. The resulting mixture was subjected to dehydration at 100° C. to 105° C. at a reduced pressure of 5 to 10 mmHg for 1 hour. The product was taken out from the flask after cooling and thereby yielded a liquid polyol composition having an $NH_2.OH$ equivalent of 189.

Example 3

To 100 parts of the polyol composition prepared according to Preparation 2 were added to 0.5 part of ion-exchanged water, 0.3 part of a foam stabilizer Toray Silicone SH-193 (a product of Dow Corning Toray Silicone Co., Ltd.) and 0.3 part of catalyst TOYOCAT-ET (N,N-dimethylaminoethyl ether, a product of Tosoh Corporation). The mixture was fully blended and was placed into a polyol tank of a two-component mixing casting machine and was held to a temperature of 60° C. Separately, the urethane prepolymer (i) prepared according to Preparation 1 was placed in a prepolymer tank of the two-component mixing casting machine and was held at a temperature of 80° C. Using the two-component mixing casting machine, a total of about 260 g of the urethane prepolymer (i)(2) and the polyol composition (1) was cast in a weight ratio (urethane prepolymer (i)(2)/polyol composition (1)) of 260/101.1 in a mold (120 mm by 280 mm by 15 mm) heated to 110° C. The mold was immediately covered with a lid and was left standing at 110° C. for 1 hour. The foamed molded article was taken out from the mold and was subjected to aftercuring at 110° C. for 16 hours. The molded article was cut to a thickness of about 2 mm using a slicer and thereby yielded an abrasive foam sheet having a uniform density distribution and exhibiting excellent physical properties.

Example 4

To 100 parts of the polyol composition prepared according to Preparation 2 were added 0.7 part of ion-exchanged water, 0.3 part of a foam stabilizer Toray Silicone SH-193 (a product of Dow Corning Toray Silicone Co., Ltd.), 0.3 part of a catalyst TOYOCAT-ET (N,N-dimethylaminoethyl ether, a product of Tosoh Corporation) and 79.3 parts of an abrasive grain HF-210 (cerium oxide, a product of Shin Nippon Metal & Chemical Co., Ltd.). The mixture was fully blended and was placed into a polyol tank of a two-component mixing casting machine and was held to a temperature of 60° C. Separately, the urethane prepolymer (i) prepared according to Preparation 1 was placed in a prepolymer tank of the two-component mixing casting machine and was held at a temperature of 80° C. Using the two-component mixing casting machine, a total of about 260 g of the urethane prepolymer (i)(2) and the polyol composition (1) in a weight ratio (urethane prepolymer (i)(2)/polyol composition (1)) of 270/180.6 was cast in a mold (120 mm by 280 mm by 15 mm) heated to 110° C. The mold was immediately covered with a lid and was left standing at 110° C. for 1 hour. The foamed molded article was taken out from the mold and was subjected to aftercuring at 110° C. for 16 hours. The molded article was cut to a thickness of about 2 mm using a slicer and thereby yielded an abrasive foam sheet having a uniform density distribution and exhibiting excellent physical properties.

Comparative Example 4

To 58.7 parts of PANDEX E (a product of Dainippon Ink and Chemicals, Inc.) containing 98% or more of MBOCA were added to 0.5 part of ion-exchanged water, 0.3 part of a foam stabilizer Toray Silicone SH-193 (a product of Dow Corning Toray Silicone Co., Ltd.) and 0.3 part of catalyst TOYOCAT-ET (N,N-dimethylaminoethyl ether, a product of Tosoh Corporation). The mixture was fully blended at 120° C., was placed into a polyol tank of a two-component mixing casting machine and was held at a temperature of 120° C. Separately, the urethane prepolymer (i) prepared according to Preparation 1 was placed in a prepolymer tank of the two-component mixing casting machine and was held at a temperature of 80° C. Using the two-component mixing casting machine, a total of about 260 g of the urethane prepolymer component and the polyamine component in a weight ratio of the former to the latter of 300/81.5 was cast in a mold (120 mm by 280 mm by 15 mm) heated to 110° C. The procedure of Example 3 was repeated and the product was cut to a thickness of about 2 mm in order to yield a sheet-form abrasive. However, water in the tank evaporated to thereby fail to provide an abrasive foam sheet having a uniform density distribution.

Comparative Example 5

The procedure of Comparative Example 4 was carried out, except that the temperature of the polyol tank containing the same MBOCA composition as Comparative Example 4 was reduced to 90° C. at which water does not evaporate. However, MBOCA (PANDEX E, Dainippon Ink and Chemicals, Inc.) solidified to inhibit the mixing and casting of the two components.

Comparative Example 6

To 300 parts of the urethane prepolymer (i) held at a temperature of 80° C. were added 0.6 part of ion-exchanged water, 0.6 part of a foam stabilizer Toray Silicone SH-193 (a product of Dow Corning Toray Silicone Co., Ltd.) and 0.6 part of a catalyst TOYOCAT-ET (N,N-dimethylaminoethyl ether, a product of Tosoh Corporation). The mixture was blended and placed into a prepolymer tank and was held at a temperature of 80° C. PANDEX E (MBOCA, a product of Dainippon Ink and Chemicals, Inc.) was placed into a polyol tank and was held at a temperature of 120° C. so as to avoid MBOCA from solidifying. The procedure of Example 3 was carried out using the two-component mixing casting machine in order to produce a molded article, but the urethane prepolymer reacted with water and solidified in the prepolymer tank, thus failing to carry out the molding process.

The hardness (Shore A), tensile strength, tensile stress, breaking elongation and tear strength of the abrasive foam sheets each having a thickness of about 2 mm prepared according to Examples 3 and 4 were determined by the following methods. The results are shown in Table 2, indicating that each of the abrasive foams exhibits satisfactory performance as an abrasive foam.

"Hardness (Shore A)": A sample was left standing in a room at a temperature of 23° C. and humidity of 50% for 24 hours or longer. Six sample sheets having a thickness of 1.5 mm were stacked and subjected to the determination of Shore A hardness according to Japanese Industrial Standards (JIS) K7312.

"Tensile strength, tensile stress and breaking elongation": A sample was left standing in a room at a temperature of 23° C. and humidity of 50% for 24 hours or longer. The properties were determined at a tensile speed of 50 mm/min using a precision universal tester Shimadzu Autograph AG-100KNG (a product of Shimadzu Corporation) according to JIS K7312.

TABLE 2

|  | Example 3 | Example 4 |
|---|---|---|
| Prepolymer (i) | 260 | 270 |
| Polyol composition | 100 | 100 |
| Ion-exchanged water | 0.5 | 0.7 |
| Foam stabilizer Toray Silicone SH-193 | 0.3 | 0.3 |
| Catalyst TOYOCAT-ET | 0.3 | 0.3 |
| Grain HF-210 | — | 79.3 |
| Specific gravity (g/cm$^3$) | 0.52 | 0.41 |
| Hardness (Shore-A) | 92 | 81 |
| Tensile strength (MPa) | 7.5 | 3.7 |
| 25% Modulus (MPa) | 5.9 | 2.6 |
| 50% Modulus (MPa) | 7 | 3.1 |
| Breaking elongation (%) | 58 | 75 |
| Tear strength (kN/m) | 32.6 | 22.4 |

INDUSTRIAL APPLICABILITY

The polyol compositions of the present invention each comprise specific amounts of the mixture (A) containing specific polyaminochlorophenylmethane compound and the polyol (B), exhibit good miscibility and excellent dissolution stability and are liquid. This enables molding of foamed molded articles for abrasives using a simple two-component mixing casting machine. According to the present invention, water serving as a foaming agent can be added to the polyol composition containing MBOCA, and the composition for a two-component curable abrasive foam can be held to a temperature equal to or lower than the boiling point of water, thus avoiding water from evaporating upon molding. The resulting abrasive foam has a uniform density distribution and exhibits excellent mechanical properties. By incorporating a grain, the present invention can further provide an abrasive foam which is further useful, and a production method thereof. The abrasive foams of the present invention are useful for polishing precision products such as glass and silicon semiconductor.

The invention claimed is:

1. A polyol composition (1) for a two-component curable abrasive foam, comprising:

a polyol (B) and a polyaminochlorophenylmethane mixture (A), which comprises the following compounds which total to a 100% weight basis:

50 to 70% by weight of a binuclear polyaminochlorophenylmethane compound represented by the following formula:

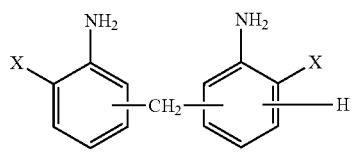

wherein X represents a chlorine atom, 20 to 40% by weight of a trinuclear polyaminochlorophenylmethane compound represented by the following formula:

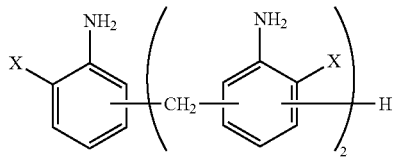

wherein X represents a chlorine atom, and 5 to 10% by weight of a tetranuclear or higher polyaminochlorophenylmethane compound represented by the following formula:

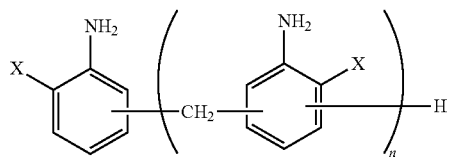

wherein X represents a chlorine atom; and n represents an integer of 3 or greater, wherein the polyaminochlorophenylmethane mixture (A) is uniformly dissolved in the polyol (B), and the weight ratio of (A) to (B) ((A)/(B)) stands at 40/60 to 60/40, wherein the polyol (B) is a polyol containing ether bond in a principal chain thereof and having a molecular weight of 100 to 1500 and/or a polyol containing methyl group in a side chain thereof and having a molecular weight of 50 to 500.

2. The polyol composition for a two-component curable abrasive foam according to claim 1, wherein the polyol (B) is at least one selected from tetramethylene glycol and polypropylene glycols.

3. A composition for a two-component curable abrasive foam, comprising the polyol composition (1) according to claim 1, a polyisocyanate (2) and water (3), wherein the composition for a two-component curable abrasive foam, is obtained by adding water (3) in the polyol composition (1); and mixing the polyol composition (1) containing water (3), and a polyisocyanate (2).

4. The composition for a two-component curable abrasive foam according to claim 3, wherein the polyisocyanate (2) is an isocyanate-group-containing urethane prepolymer having an isocyanate equivalent weight of 300 to 580.

5. The composition for a two-component curable abrasive foam according to claim 3, wherein the polyisocyanate (2) is a toluene diisocyanate urethane prepolymer containing a terminal isocyanate group.

6. An abrasive foam, as a foamed and cured product of the composition for a two-component curable abrasive foam according to claim 3, wherein the abrasive foam has a specific gravity of 0.3 to 1.2 g/cm$^3$.

7. A method for producing an abrasive foam, comprising the steps of casting the composition for a two-component curable abrasive foam of claim 3 in a mold, and foaming and curing the composition.

8. The method for producing an abrasive foam, comprising the steps of (i.) adding water (3) in a polyol composition (1) for a two-component curable abrasive foam, which comprises a polyol (B) and a polyaminochlorophenylmethane mixture (A), which comprises the following compounds which total to a 100% weight basis:

50 to 70% by weight of a binuclear polyaminochlorophenylmethane compound represented by the following formula:

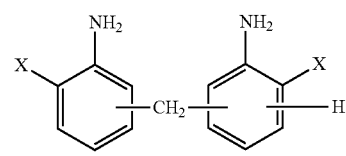

wherein X represents a chlorine atom, 20 to 40% by weight of a trinuclear polyaminochlorophenylmethane compound represented by the following formula:

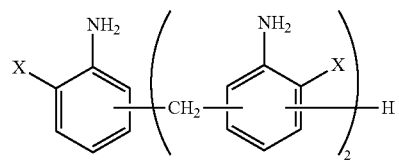

wherein X represents a chlorine atom, and 5 to 10% by weight of a tetranuclear or higher polyaminochlorophenylmethane compound represented by the following formula:

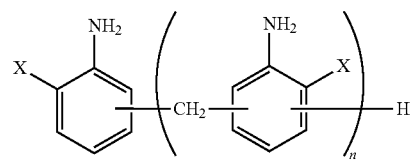

wherein X represents a chlorine atom; and n represents an integer of 3 or greater, wherein the polyaminochlorophenylmethane mixture (A) is uniformly dissolved in the polyol (B), and the weight ratio of (A) to (B) ((A)/(B)) stands at 40/60 to 60/40; wherein the polyol (B) is a polyol containing ether bond in a principal chain thereof and having a molecular weight of 100 to 1500 and/or a polyol containing methyl group in a side chain thereof and having a molecular weight of 50 to 500, (ii.) separately placing the polyol composition (1) containing water (3) and a polyisocyanate (2) into each tank of a two-component mixing casting machine, (iii.) heating the polyol composition (1) containing water (3) at 40° C. to 70° C., and heating the polyisocyanate (2) at 40° C. to 90° C.,
(iv.) mixing the heated polyol composition (1) containing water (3) and the heated polyisocyanate (2) in the two-component mixing casting machine to yield a composition for a two-component curable abrasive foam,
(v.) casting the composition for a two-component curable abrasive foam in a mold at 80° C. to 120° C.; and
(vi.) foaming and curing the composition casted in the mold.

9. The abrasive foam, which is obtained by the method for producing an abrasive foam according to claim 8, wherein the abrasive foam has a specific gravity of 0.3 to 1.2 g/cm$^3$.

* * * * *